Aug. 21, 1934.  J. F. MUMMERT  1,970,571
SUPPORT FOR HORIZONTAL CYLINDRICAL TANKS
Filed Nov. 11, 1932  6 Sheets-Sheet 1
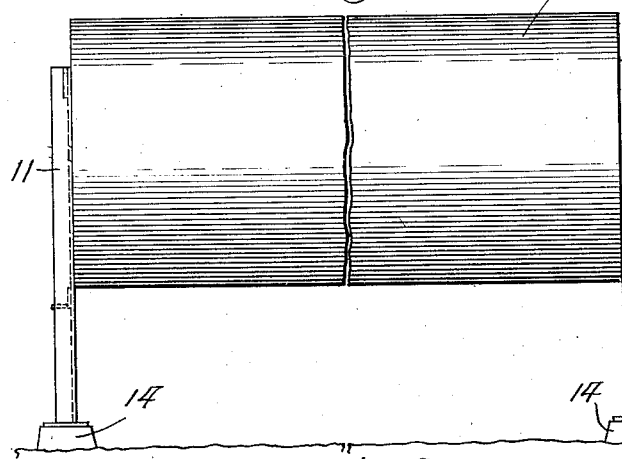
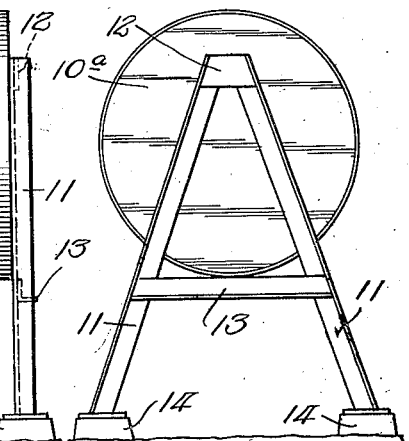
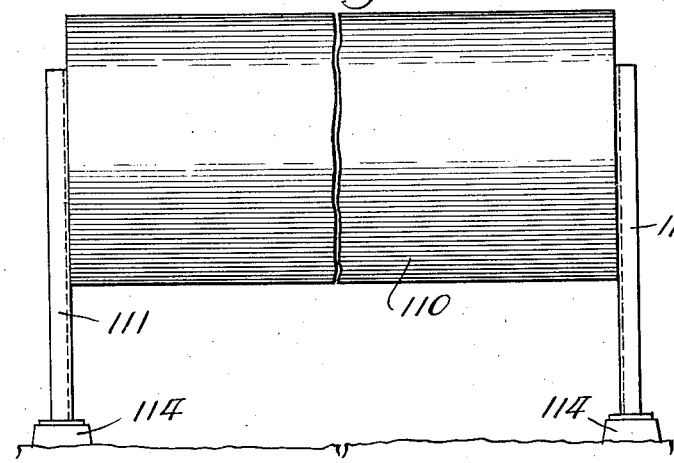
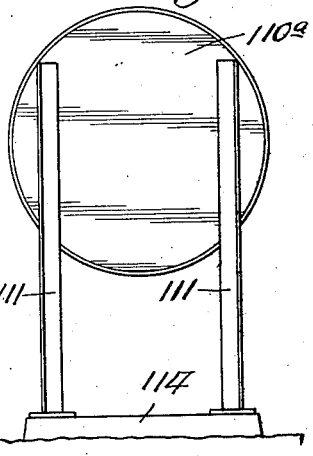
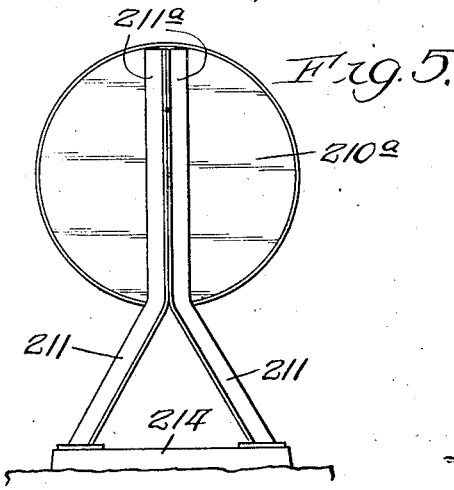
Inventor:
John F. Mummert,

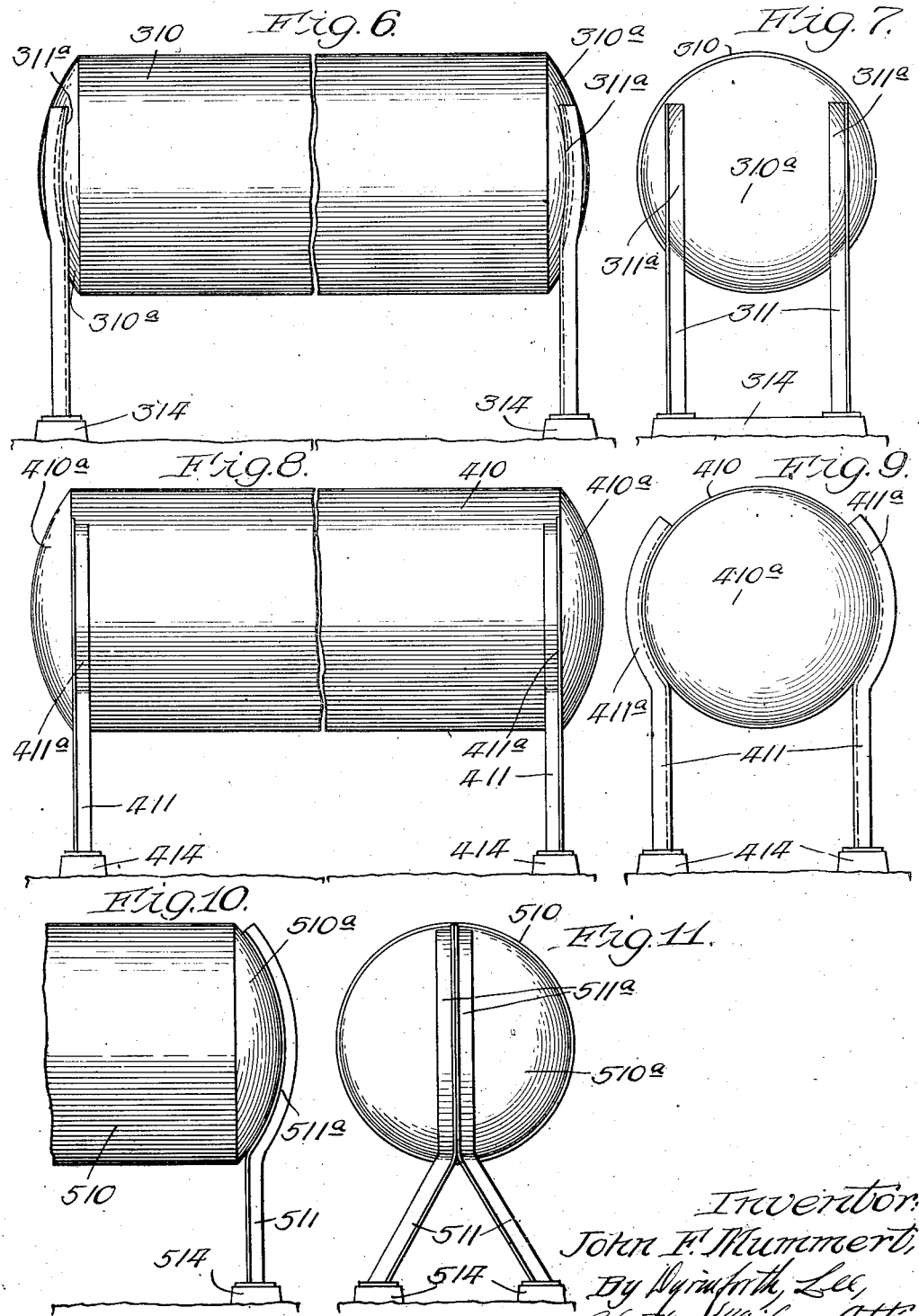

Aug. 21, 1934.   J. F. MUMMERT   1,970,571
SUPPORT FOR HORIZONTAL CYLINDRICAL TANKS
Filed Nov. 11, 1932   6 Sheets-Sheet 3
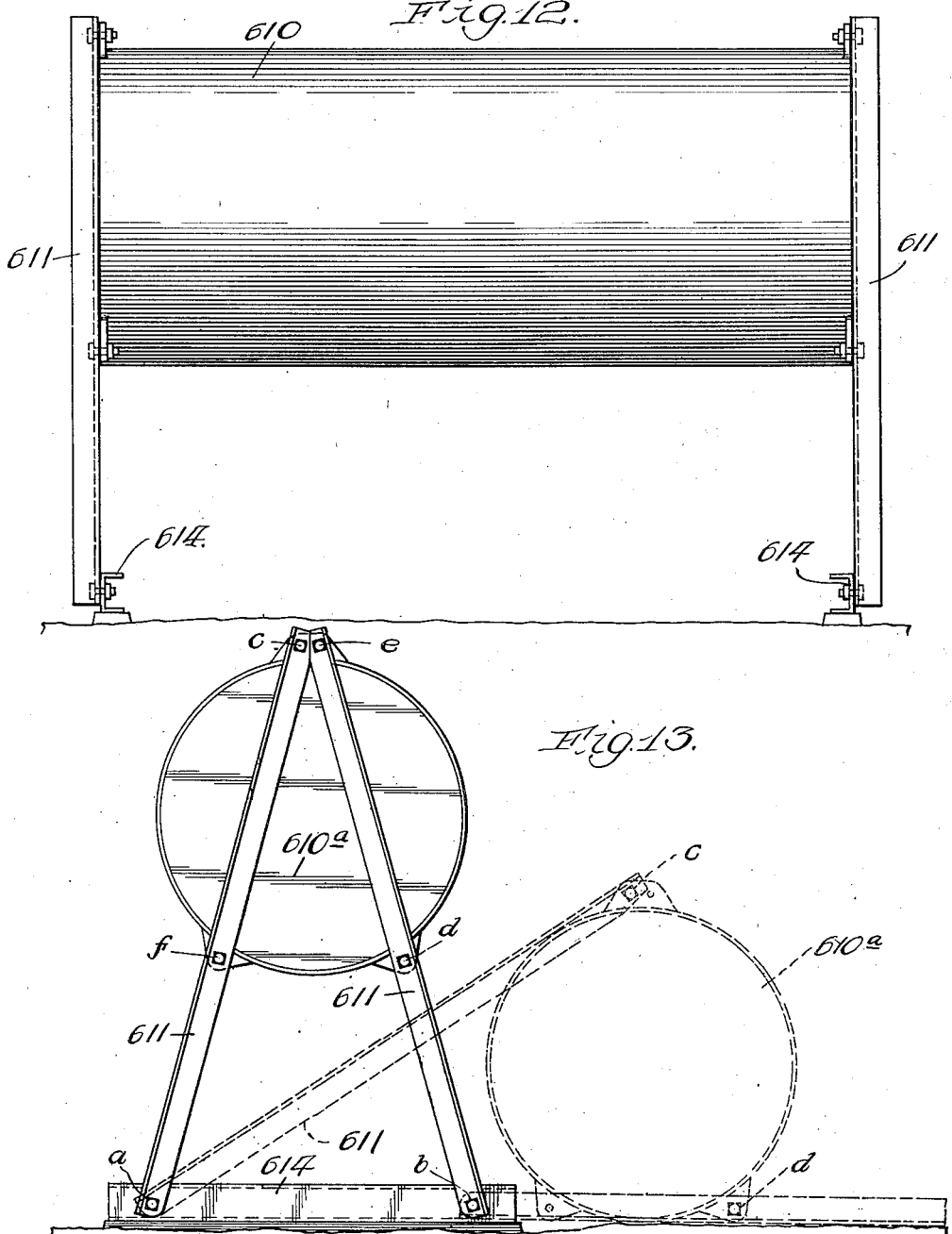

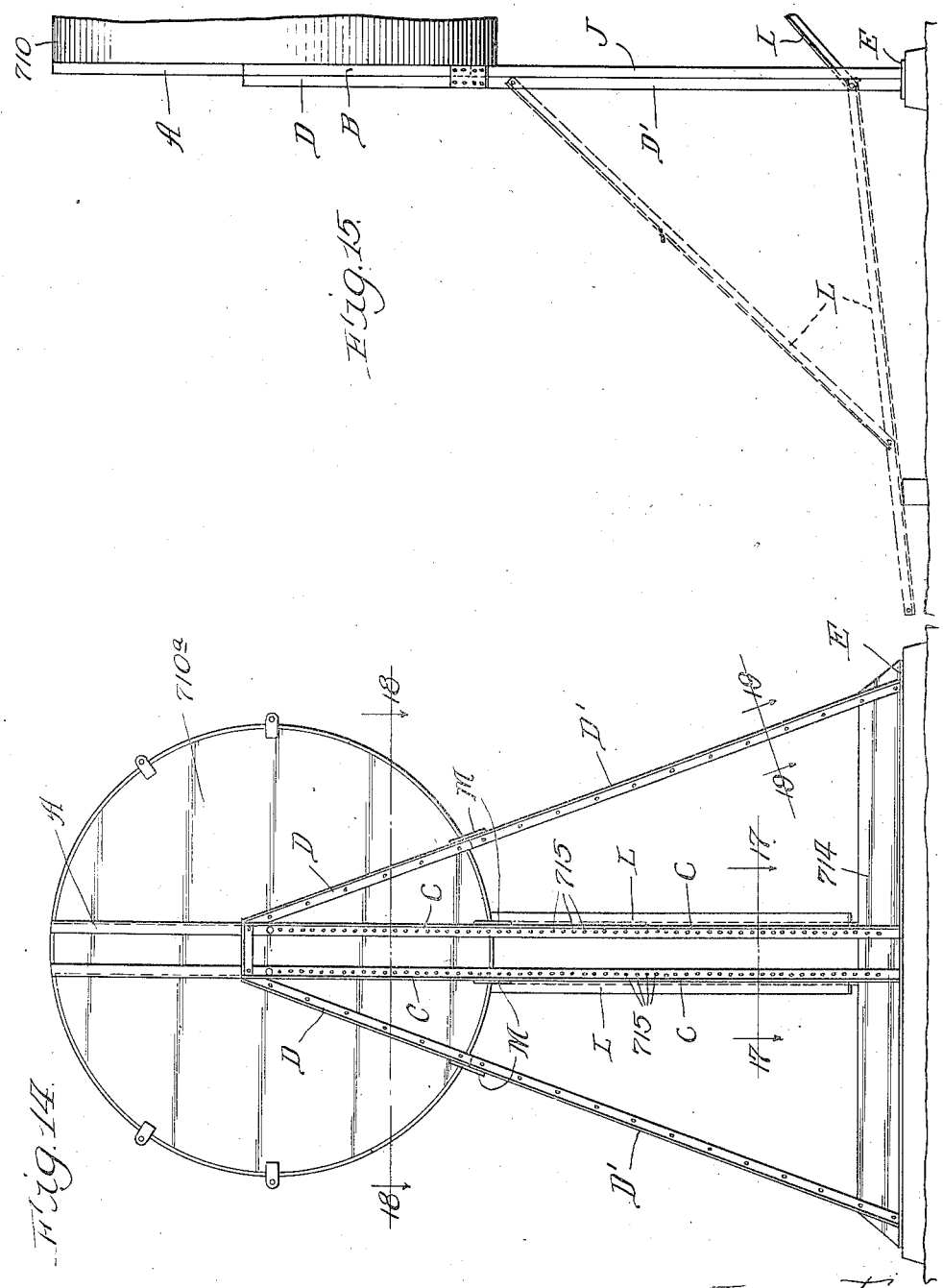

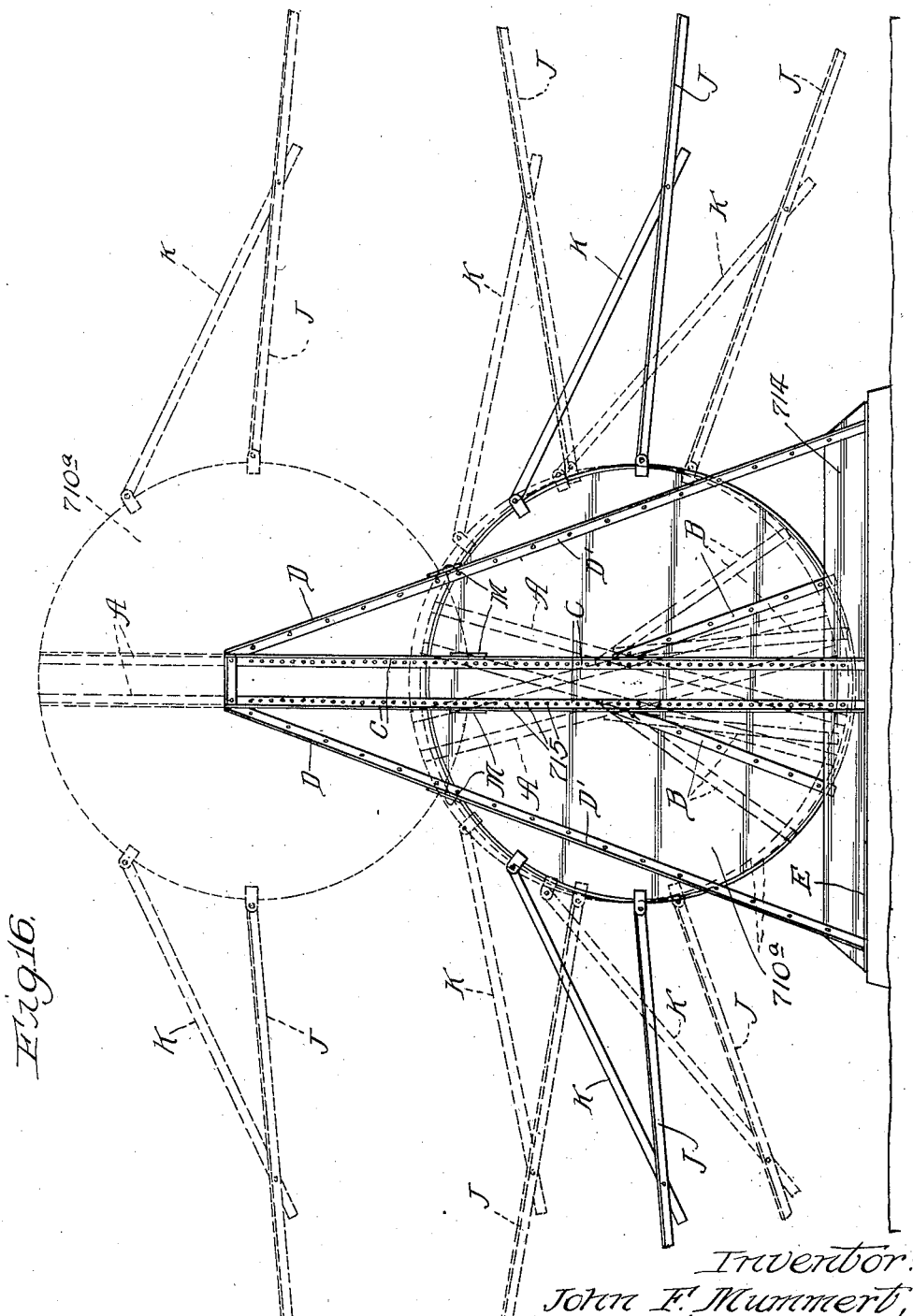

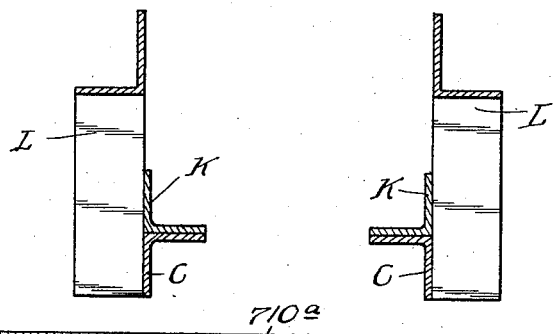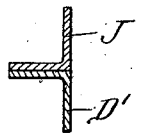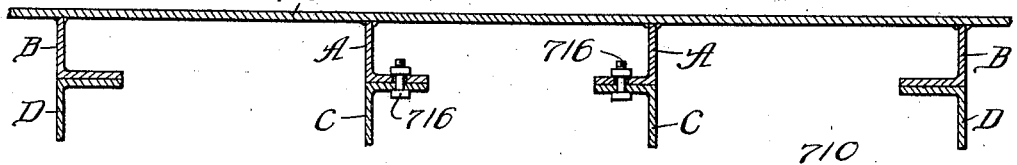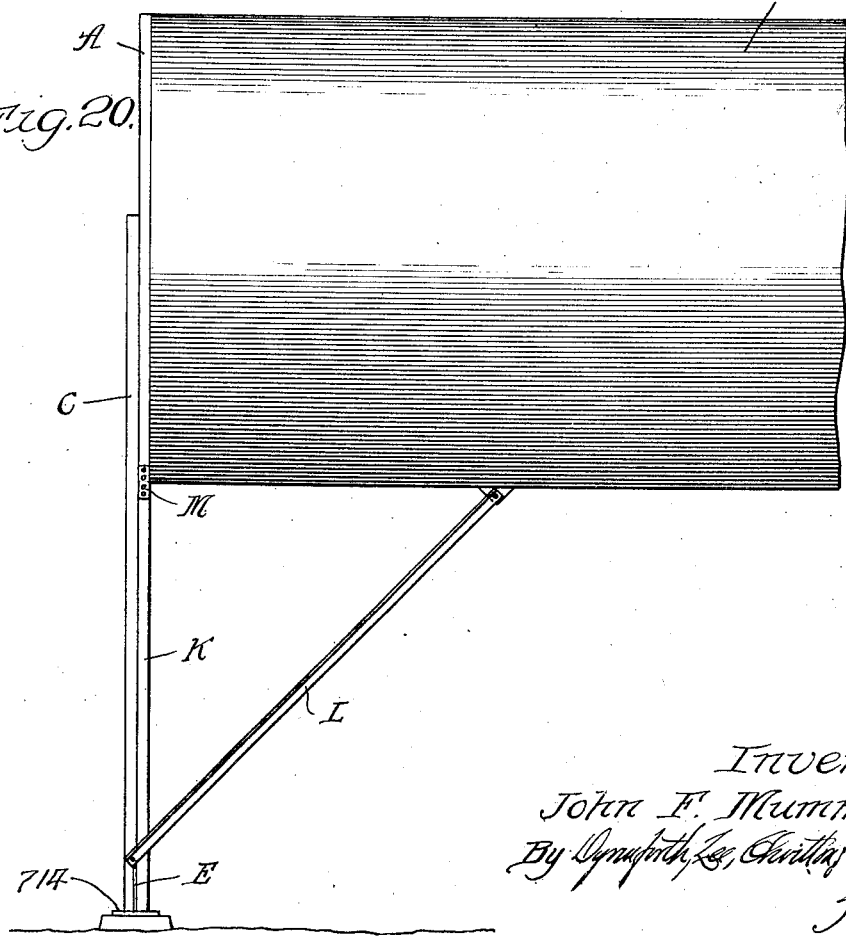

Patented Aug. 21, 1934

1,970,571

UNITED STATES PATENT OFFICE 1,970,571

SUPPORT FOR HORIZONTAL CYLINDRICAL TANKS

John F. Mummert, Birmingham, Ala., assignor to Chicago Bridge & Iron Company, Chicago, Ill., a corporation of Illinois Application November 11, 1932, Serial No. 642,291

2 Claims. (Cl. 248—41)

This invention relates to improvements in supports for horizontal cylindrical tanks and method of erecting the same.

Considerable attention has been given to the question of proper supports for tanks of the character referred to. Heretofore, such supports have included a relatively large number of saddles fairly closely spaced under the tank. Any saddles underneath the tank introduce quite severe local stresses.

The particular feature of my invention is the provision of supports for horizontal cylindrical tanks which do away entirely with saddles under the tank. I provide supports which are attached to the tank at the ends only. I have found that the head of a cylindrical tank ordinarily is strong enough to hold the tank in its true cylindrical shape. I have found that when the heads are strong enough to hold the tank in its true shape, the spacing of supports for the same can be increased so that only two supports need be employed, one at each end of the tank.

By using only two supports, one at each end of the tank, it is possible to effect not only a saving in weight, but also a saving in the cost of the foundations upon which the supports rest.

Another feature of my invention is the provision of a support which is of assistance in reducing the cost of elevating the tank to the proper height.

Other features and advantages of my invention will appear more fully as I proceed with my specification.

In those forms of devices embodying the features of my invention shown in the accompanying drawings—

Figure 1 is a view in side elevation of a cylindrical tank employing my improved supports; Fig. 2 is a similar view in end elevation; Figs. 3 and 4 are views similar to Figs. 1 and 2, respectively, showing a modification; Fig. 5 is a view similar to Fig. 4 showing another modification; Figs. 6 and 7 are views similar to Figs. 1 and 2, respectively, showing another modification; Figs. 8 and 9 are views similar to Figs. 1 and 2, respectively, showing another modification; Figs. 10 (fragmentary) and 11 are views similar to Figs. 1 and 2, respectively, showing another modification; Figs. 12 and 13 are views similar to Figs. 1 and 2, respectively, showing another modification; Fig. 14 is a view in end elevation showing another modification; Fig. 15 is a fragmentary view in side elevation of the device of Fig. 14; Fig. 16 is a view similar to Fig. 14 showing the method of elevating the tank; Fig. 17 is a view taken as indicated by the line 17 of Fig. 14; Fig. 18 is a view taken as indicated by the line 18 of Fig. 14; Fig. 19 is a view taken as indicated by the line 19 of Fig. 14; and Fig. 20 is a view similar to Fig. 15 with parts broken away.

As shown in the drawings, the exact details of the support may vary considerably, the general principles being retained.

In Figs. 1 and 2, the cylindrical tank is indicated by 10 and the heads by 10$^a$. At each end the support comprises an A-frame including the two uprights 11, 11 with their upper ends connected together by a plate 12. 13 indicates the cross brace. The members 11 and 13 may be of any suitable material, for example, angle irons. The lower ends of the uprights or legs 11 may rest upon suitable concrete foundations 14, 14. The upper portions of the uprights or legs 11 are attached to the heads 10$^a$ in any suitable manner, as, for example, by welding. Preferably, the attachment should extend through the major portion of the leg or upright that lies adjacent to or contacts with the head of the tank.

In the construction of Figs. 3 and 4, the tank is indicated by 110 and the heads by 110$^a$. In this form, instead of employing an A-frame at each end, I use a pair of uprights 111, 111 with their upper ends attached to the head of the tank and their lower ends resting upon a suitable foundation 114.

The form of Fig. 5 is substantially the same as that shown in Fig. 4, except that the uprights 211 at each end of the tank are slanted toward each other so that they meet at the bottom edge of the tank. From this point they lie parallel and adjacent to each other and extend entirely across the head 210$^a$ of the tank. The parallel portions, as indicated by 211$^a$, are attached to the head 210$^a$ and the lower ends of the legs 211 rest upon the foundation 214.

The form of Figs. 6 and 7 is substantially the same as that shown in Figs. 3 and 4, except that the tank 310 is provided with rounded heads 310$^a$. Consequently, the upper portions of the uprights 311 are rounded, as indicated by 311$^a$, where they are attached to the head 310$^a$. 314 indicates the foundation.

In the form of Figs. 8 and 9, the tank 410 is also provided with rounded heads 410$^a$. In this form, however, the upper ends 411$^a$ of the uprights 411 are not attached directly to the head but are attached to the cylindrical portion of the tank at its extreme end. Accordingly, they are curved to conform to the curvature of this cylindrical portion. The lower ends of the legs rest on the foundations 414.

In the device of Figs. 10 and 11, the tank 510 also has rounded heads 510ª. As here shown, the supports resemble those shown in Fig. 5, except that the upper portions 511ª of the same are rounded where attached to the heads 510ª. The lower ends of the supports are indicated by 511 and their bottom ends rest upon the foundations 514.

In Figs. 12 and 13, I have shown a cylindrical tank 610 with flat heads 610ª and have provided supports designed to permit easy and quick erection of the tank thereon. In the form here shown, the supporting members are indicated by 611, there being a pair at each end of the tank. Prior to erection the tank is laid on the ground or floor at one side of its permanent location, as indicated by broken lines in Fig. 13. The lower ends of the members 611 at each end of the tank are pivotally attached to a suitable base or foundation member 614, the pivot points being indicated by a and b, respectively. At each end of the tank, the upper end of one of the members 611 is pivotally attached to the head of the tank substantially at the top of said head, as indicated by c. The other member is pivotally attached to the head at one side of the bottom of said head, as indicated by d.

The structure is then in the position shown by the broken lines in Fig. 13. From this point the remote ends of the members 611 lying on the ground are raised, the various parts pivoting on the centers a, b, c and d. This is continued until the upper ends of the members 611 come together, as indicated by the solid lines in Fig. 13, whereupon the bolts e and f are placed in position to form a rigid permanent support for the tank.

In the structure of Figs. 14 to 20, inclusive, the tank is indicated by 710 and provided with flat heads 710ª. At each end of the tank I provide a pair of spaced vertical supporting members C, C, each provided with a series of holes 715. The tank head is provided with angle irons A, A provided with holes in which the bolts 716 may be inserted. These holes are a little bit larger than the bolts 716 so as to permit a loose fit. This is done to enable the tank to be rocked or "walked" upwardly, as hereinafter explained.

At the commencement of the erection, the tank is laid on the ground, as shown by solid lines in Fig. 16. The uprights C, C are suitably supported, for example, by attaching their lower ends to a base or foundation member 714. One of the bolts 716 is then inserted at each end and the tank rocked sufficiently to place the other bolt at each end in the next higher hole in the other upright C. The lower bolts are then taken out and the tank rocked in the other direction and the bolts replaced in the next higher hole. In this manner, the tank is rocked or "walked" upwardly until the desired height is reached. The rocking of the tank may be facilitated by attaching the members J and K to the tank, as shown in Fig. 16, to give the desired leverage. During this raising, the members L may be employed, as indicated by the broken lines in Fig. 15.

After the tank has been raised to the desired height, the members L are placed in the position shown in Fig. 14 and as indicated by the solid lines in Fig. 15. Diagonal members are also put in place at each end of the tank to give additional support. As here shown, these diagonal members are formed of double angle irons. The upper portion of each lying adjacent the head is indicated by D, B and the lower portion, D', J. After the tank is raised, I prefer to put in place uprights K, K under the uprights A, A on each head, said members K, K lying next to the lower portions of the uprights C and forming virtually continuations of the members A, A on the head.

The member 714 may rest on plates E. Suitable splice plates M may be employed for fastening together abutting ends of supporting members, for example, the abutting ends of the members D and D'.

Where the supporting members at the end of the tank have a considerable portion of their length attached to the head of the tank, such attachment may assist in stiffening the head.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. In combination with a horizontal cylindrical tank having heads, a pair of spaced vertical supporting members at each end thereof provided with a series of holes, securing means on each head of the tank, and means for detachably securing said securing means first to one support of each pair and then to the other, said securing means cooperating with the holes in said supporting members, whereby the tank can be elevated by rocking the same on said supports.

2. In combination with a horizontal cylindrical tank having heads, supporting means at each end thereof, each provided with two vertical spaced rows of holes, securing means secured on each head of the tank, and means for detachably securing said securing means successively first to one of the holes of one row in each supporting means and then to one of the holes of the other row, whereby the tank can be elevated by rocking the same on said supporting means.

JOHN F. MUMMERT.